United States Patent [19]
Okamoto et al.

[11] Patent Number: 5,237,624
[45] Date of Patent: Aug. 17, 1993

[54] REPRODUCTION OF IMAGE PATTERN DATA

[75] Inventors: Masayuki Okamoto, Yokohama; Mitsuru Yamauchi, Kofu, both of Japan

[73] Assignee: Fujitsu Limited, Kawasaki, Japan

[21] Appl. No.: 745,805

[22] Filed: Aug. 16, 1991

[30] Foreign Application Priority Data

Aug. 18, 1990 [JP]  Japan .................................. 2-217849

[51] Int. Cl.⁵ .................................................. G06K 9/48
[52] U.S. Cl. ...................................... 382/22; 358/447; 382/54
[58] Field of Search ................ 382/22, 56, 54, 41, 382/25; 358/447

[56] References Cited

U.S. PATENT DOCUMENTS

| | | | |
|---|---|---|---|
| 4,110,736 | 8/1978 | Kono | 382/22 |
| 4,375,654 | 3/1983 | Evans et al. | 382/22 |
| 4,729,127 | 3/1989 | Chan et al. | 382/56 |
| 4,791,676 | 12/1988 | Flickner et al. | 382/22 |
| 4,856,074 | 8/1989 | Nagaoka | 382/22 |
| 5,033,105 | 7/1991 | Atkinson | 382/22 |
| 5,093,869 | 3/1992 | Alves et al. | 382/22 |
| 5,105,472 | 4/1992 | Murayama | 382/22 |

FOREIGN PATENT DOCUMENTS 63-305478 12/1988 Japan .

OTHER PUBLICATIONS

"16-2 Scan-Converting Polygons", W. M. Newman Principles of Internative Computer Graphics, Second Edition, pp. 232-245.

*Primary Examiner*—Joseph Mancuso
*Attorney, Agent, or Firm*—Armstrong, Westerman, Hattori, McLeland & Naughton

[57] ABSTRACT

In a system for reproducing an image pattern data, a decision point designation means exclusively designates a decision point at the corresponding coordinate position in a coordinate region of image pattern reproduction in divisional coordinate regions when a decision point extracted based on a region decision data obtained by region decision means is located in a region of the first kind, exclusively designates a decision point at the scan starting point of a coordinate region of image pattern reproduction when the extracted decision point is located in a region of the second kind, designates no decision point when the extracted decision point is located in a region of the third kind, and, based on the designation by the decision point designation means, a shading of dots of the image is carried out.

8 Claims, 11 Drawing Sheets

REPRODUCTION OF IMAGE PATTERN DATA

BACKGROUND OF THE INVENTION

1. Field of the Invention

The present invention relates to a system for reproducing an image pattern data. The system according to the present invention is used, for example, for reproducing an image pattern, such as a character, graphic pattern and the like, in the form of a display by a cathode ray tube, or as a printout by a printer, etc.

2. Description of the Related Arts

In a system for producing an image pattern data, in the data extraction process, an image pattern data in the form of, for example, 12×12 dots is derived from an original image pattern, an outline point data is extracted from the image pattern data, a bend point data is extracted from the outline point data, and the extracted data are stored as an outline data in a contour data storage.

In the image reproduction process, based on the data stored in the outline data storage, the bend point data and the outline point data is reproduced, and accordingly, the outline data is reproduced, and from the outline data, a decision point data is extracted. A shading decision point or a decision point is used as the indication of a point of a start of shading or a point of a termination of shading. Based on the extracted decision point data, the image pattern data reproduced corresponds to the original image pattern, and thus the original image is regenerated.

Nevertheless, a problem arises in that, assuming a coordinate region of image pattern reproduction is an area of 6×6 dots, it is sometimes impossible to handle a coordinate region, such as 12×12 dots, which is greater than the coordinate region of image pattern reproduction of 6×6 dots, to reproduce an image pattern data corresponding to the original image pattern, without a failure in the reproduction.

SUMMARY OF THE INVENTION

An object of the present invention is to provide an improved system for reproducing an image pattern data by which a correct reproduction of an image pattern data is attained even if a coordinate region required for an original image pattern is greater than a coordinate region of the image pattern reproduction.

In accordance with the present invention, there is provided a system for reproducing an image pattern data including:

an outline data input portion for inputting from outside an outline data of an image;

an outline reproduction portion for reproducing outline points from the outline data input by the outline data input portion;

a decision point extraction portion for extracting decision points for deciding shaded points from the outline points reproduced by the outline reproduction portion;

a coordinate region forming portion for reproducing the image pattern data, forming a coordinate region of image pattern reproduction, and obtaining the image pattern data; a region decision portion for dividing the coordinate region in which the outline points of the outline point data are to be reproduced into a plurality of regions each having area of the coordinate region of image pattern reproduction, where the image pattern to be reproduced in the coordinate region of image pattern reproduction requires a coordinate region greater than the coordinate region of image pattern reproduction, and deciding whether a decision point extracted by the decision point extraction portion is located in a region of the first kind which is designated as the coordinate region in which the image pattern data is to be reproduced, in a region of the second kind which is the preceding region of the coordinate region designated as the coordinate region in which the image pattern data is to be reproduced, or in a region of the third kind which is the region other than the first and second kind regions;

a decision point designation portion for exclusively designating the decision point at the corresponding coordinate position in the coordinate region of image pattern reproduction in the divisional coordinate regions when the decision point extracted based on the region decision data obtained by the region decision portion is located in a region of the first kind, for exclusively designating the decision point at the scan starting point of the coordinate region of image pattern reproduction when the extracted decision point is located in a region of the second kind, and for designating no decision point when the extracted decision point is located in a region of the third kind, and a shaded portion, based on the designation by the decision point designation portion, for shading the dots of the picture.

In accordance with the present invention, there is also provided a method for reproducing an image pattern data in which decision points for deciding shaded points are extracted from outline data obtained by processing an original image data, the extracted decision points are designated in a coordinate region of image pattern reproduction, a shading of image is carried out according to the designated decision points, and accordingly a reproduction of the original image data is realized in the coordinate region of image pattern reproduction to regenerate the original image pattern, characterized in that the method comprises the steps of:

dividing the coordinate region in which the outline points of the outline data are to be reproduced into a plurality of areas, each of which areas is the area of the coordinate region of image pattern reproduction, to enable the reproduction of the original image pattern for each of the divisional coordinate regions, where the original image pattern to be reproduced in the coordinate region of image pattern reproduction requires a coordinate region having an area greater than the coordinate region of the image pattern reproduction;

deciding whether a decision point extracted from the outline data of the original picture with a reproduction of the outline points is located in a region of the first kind which is designated as the coordinate region in which the image pattern data is to be reproduced, in a region of the second kind which is the preceding region of the coordinate region designated as the coordinate region in which the image pattern data is to be reproduced, or in a region of the third kind which is the region other than the first and second kind regions;

when a decision point is located in a region of the first kind, the decision point is exclusively designated at the corresponding coordinate position in the coordinate region of image pattern reproduction in the divisional coordinate regions, when a decision point is located in a region of the second kind, the decision point is exclusively designated at the scan starting point of the coordinate region of image pattern reproduction following the region of the second kind, when a decision point is located in a region of the third kind, no decision point is designated, and carrying out, based on the exclusive designations, a shading of the dots of the image to reproduce the original image data and thereby regenerate the original image pattern.

DESCRIPTION OF THE PREFERRED EMBODIMENTS

Figure 1:
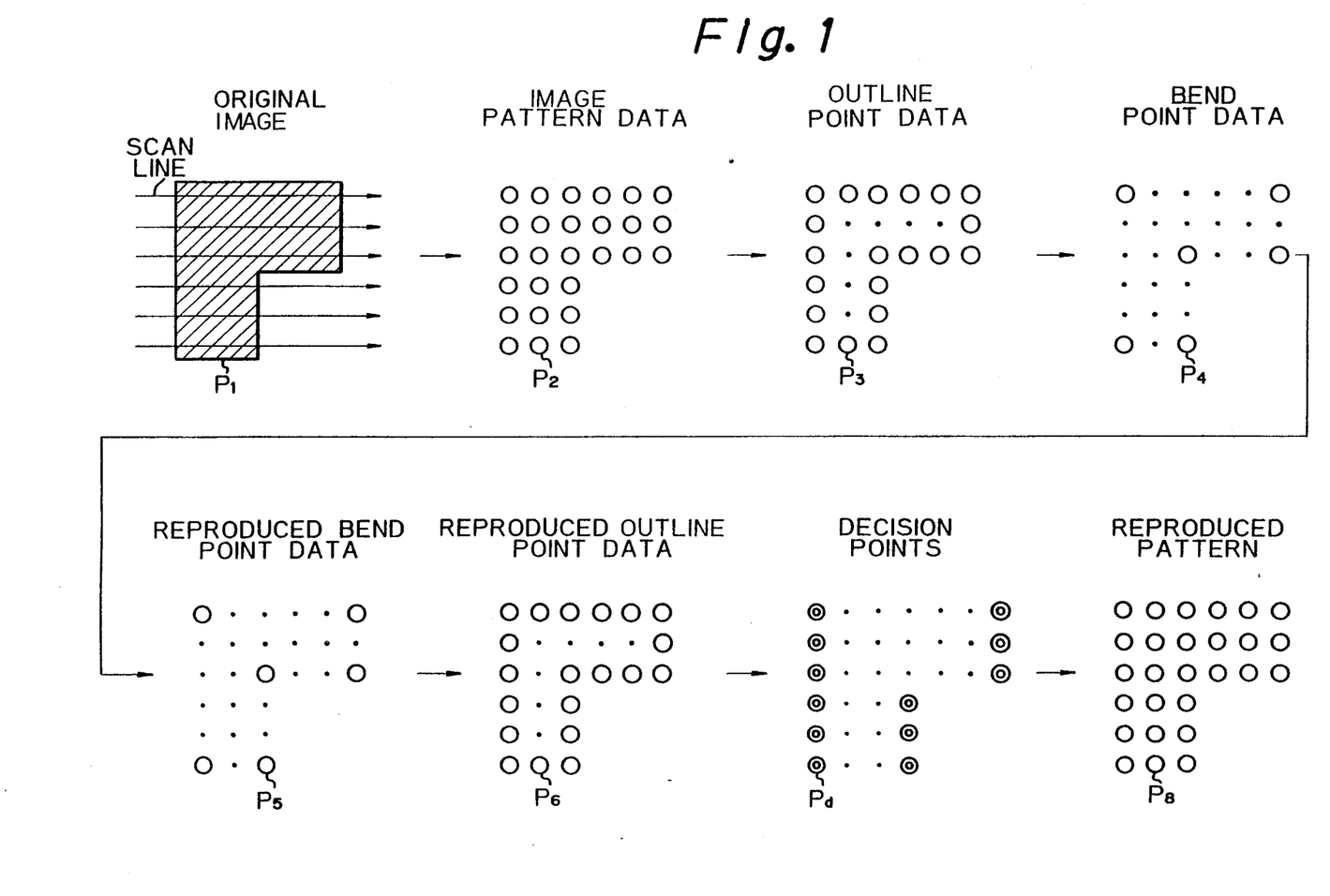
FIG. 1 illustrates a prior art process of a reproduction of image pattern data.

Before describing the preferred embodiments, a prior art system for reproducing an image pattern data will be described with reference to FIG. 1 and FIG. 2. The process of the operation of the prior art system is shown in FIG. 1.

In the step of an original image $P_1$, an original image is scanned by scan lines to produce analog image signals corresponding to the original image $P_1$. In the step of an image pattern data $P_2$, the produced analog image signals are processed by, for example, binarization processing, image deletion, image formation, and the like, to produce an image pattern data $P_2$. In the step of an outline point data $P_3$, outline points of the image pattern are extracted from the produced image pattern data to produce outline point data $P_3$. In the step of a bend point data $P_4$, bend points of the outline line are extracted from the produced outline point data to produce bend point data $P_4$. The outline data including the bend point data obtained in the step of a bend point data is stored in an outline data storage.

With regard to the process of reproducing the image pattern data, in the step of a supply of the outline data $P_5$, the outline data including the bend point data is supplied. In the step of a reproduction of the outline data $P_6$, the data of the outline points are reproduced. In the step of an extraction of shading decision points or decision points $P_d$, decision points are extracted from the reproduced outline point data $P_6$. In the drawings, a decision point $P_d$ is represented by a double circle. In the step of a storage of the extracted decision points $P_d$, the extracted decision points $P_d$ is stored as the arrangement of the extracted decision points $P_d$ in a coordinate region of image pattern reproduction. In the step of a shading of dots $P_8$, the shading of dots $P_8$ is carried out based on the stored data of the decision points.

An example of the rule of the shading of dots based on the data of the decision point $P_d$ is as follows.

When there is at least one decision point along one scan line, a decision point of an odd number (1, 3, 5 . . .) order is designated as a shading start point, a decision point of an even number (2, 4, 6 . . .) order or one preceding point of the point of the even number (2, 4, 6 . . .) order is designated as a shading termination point, and the shading from the shading start point to the shading termination point is carried out.

Figure 2A:
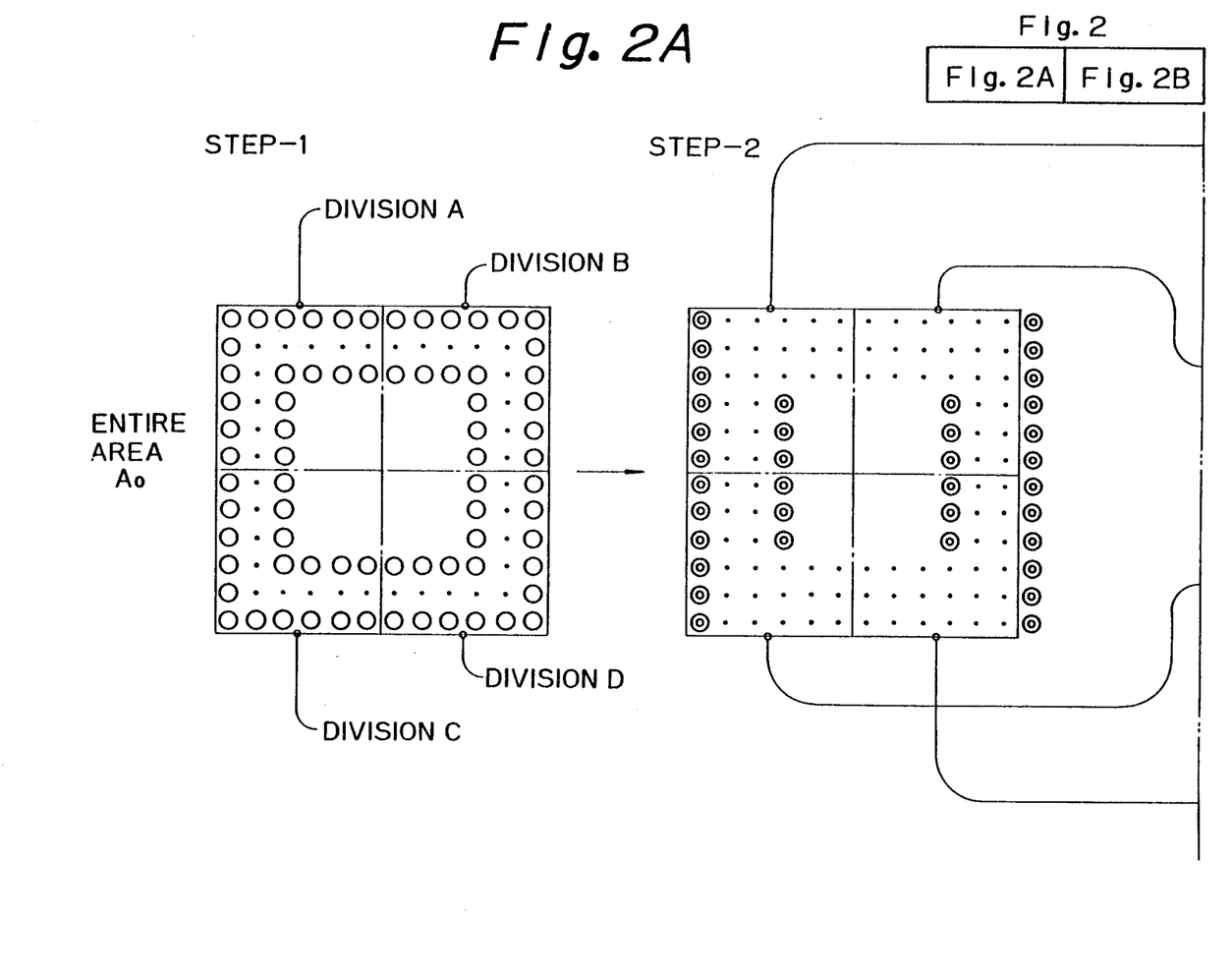
FIG. 2 illustrates a problem encountered in the prior art process of a reproduction of image pattern data.
Figure 2B:
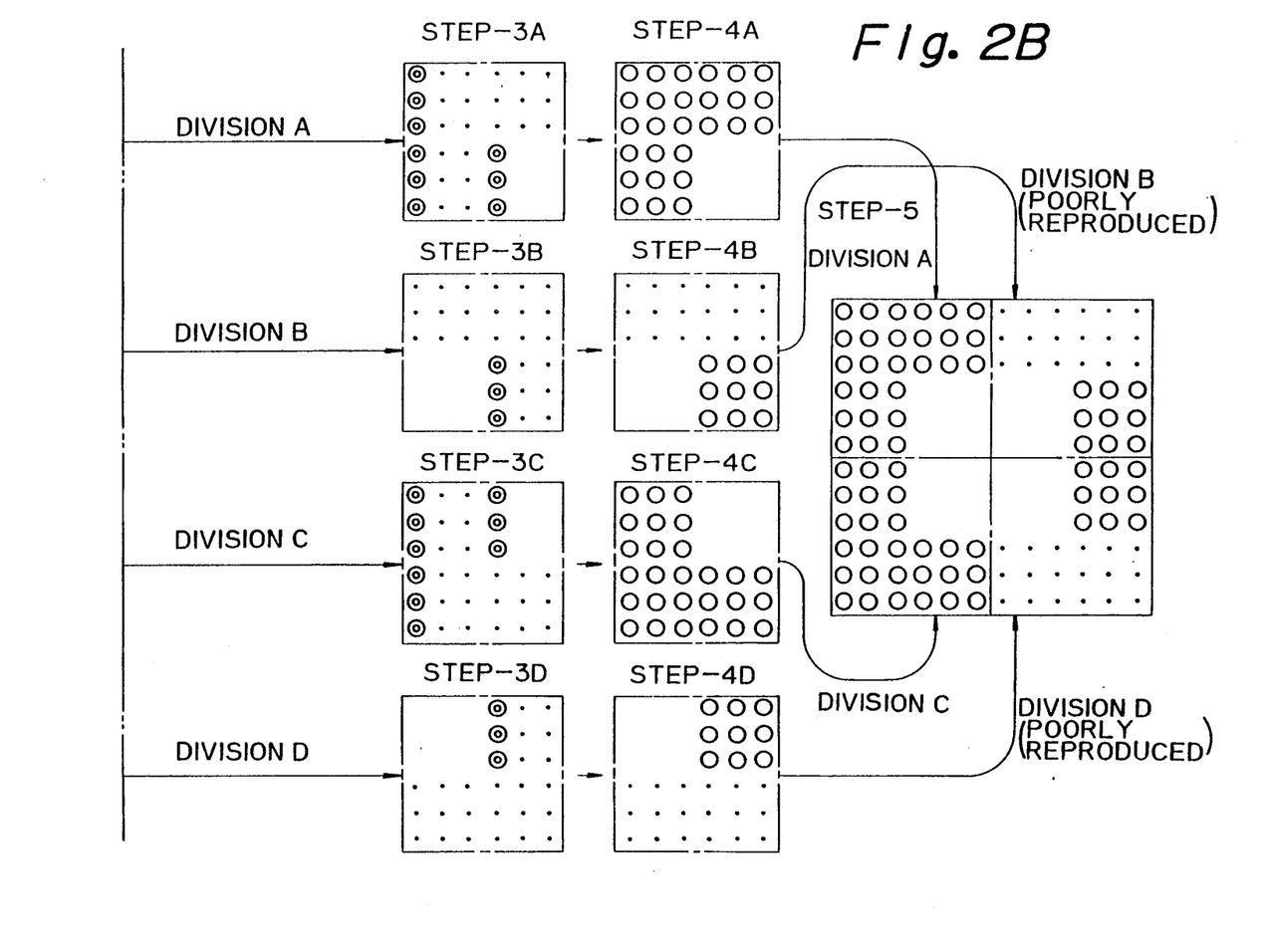

The problem in the operation of the prior art system of FIG. 1 is illustrated in FIG. 2. It is assumed that the entire area $A_O$ of the original image pattern which is desired to be reproduced, for example, 12×12 dots, is greater than the area of the coordinate region of image pattern reproduction, for example, 6 ×6 dots.

The coordinate region for which the outline points are to be reproduced is divided into 4 divisions. The reproduction of image pattern is carried out for each of the 4 divisions, and the reproduced divisional image patterns are synthesized to form the reproduced entire image pattern. The process is illustrated in the sequence of step 1, step 2, steps 3A, 3B, 3C, and 3D, steps 4A, 4B, 4C, and 4D, and step 5.

In step 1, the coordinate region for which the outline points are to be reproduced into 4 divisions, i.e., division-A, division-B, division-C, and division-D. In step 2, for each division, decision points $P_d$ are extracted. In steps 3A, 3B, 3C, and D, the decision points are designated in a coordinate region of image pattern reproduction. In steps 4A, 4B, 4C, and 4D, the shading of dots is carried out in accordance with the rule of shading using the decision points. The rule is such that, when there is at least one decision point along one scan line, a decision point of an odd number (1, 3, 5 . . .) order is designated as a shading start point, a decision point of an even number (2, 4, 6 . . .) order or one preceding point of the point of the even number (2, 4, 6 . . .) order is designated as a shading termination point, and the shading from the shading start point to the shading termination point is carried out.

Since it may happen that a decision point of an odd number (1, 3, 5 . . .) order is separated from a decision point of an even number (2, 4, 6 . . .) order which is adjacent to the above-mentioned decision point of an odd number (1, 3, 5 . . .) order along the scan line, as in the case of division-A to division-B, and the case of division-C to division-D, the shading is not satisfactorily carried out in step 4B and step 4D. Accordingly, the reproduction of the image pattern is poor in division B and division D as shown in step-4B, step-4D, and step 5 of FIG. 2.

Figure 3A:
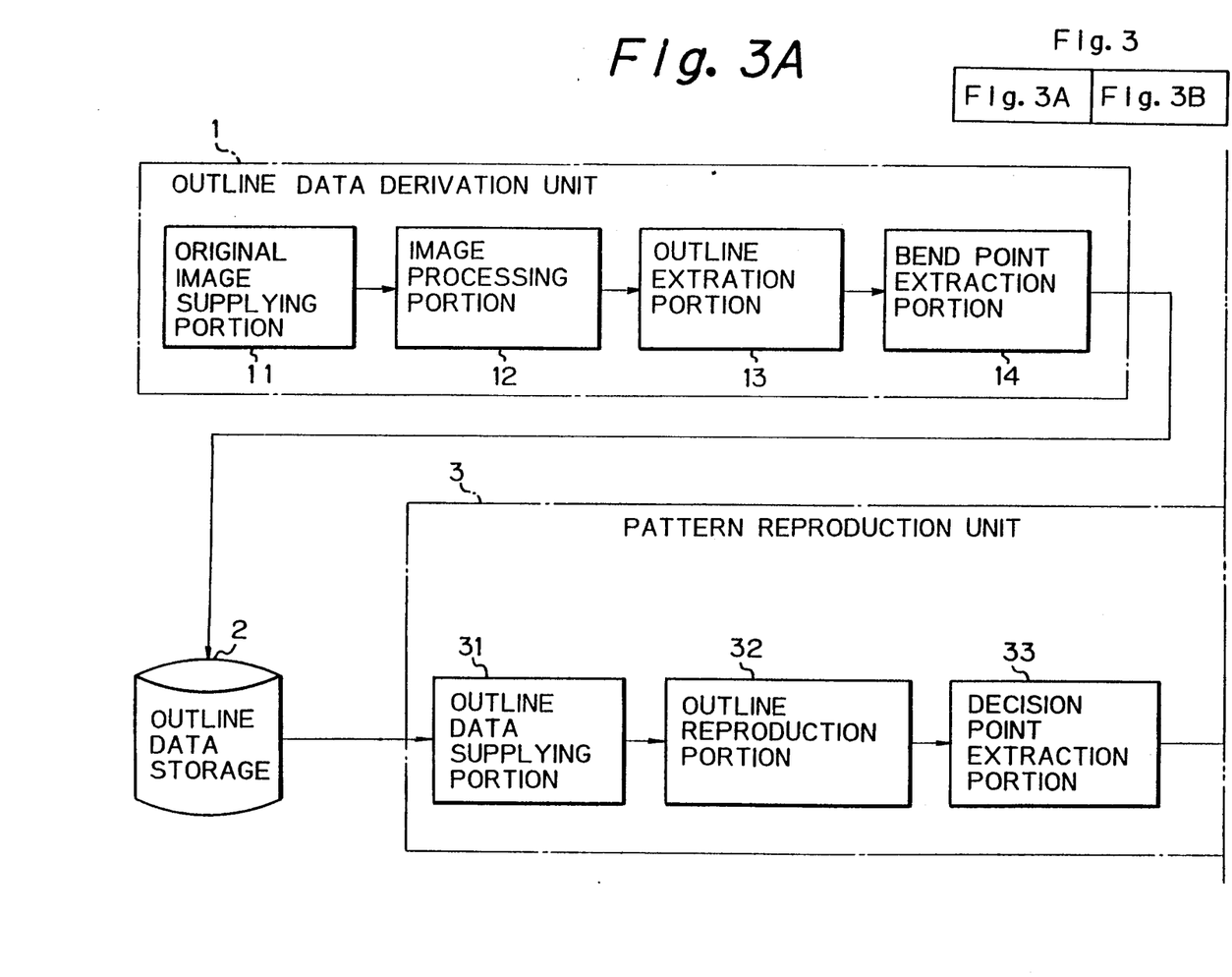
FIG. 3 is the schematic diagram of the system for reproducing an image pattern data according to an embodiment of the present invention.
Figure 3B:
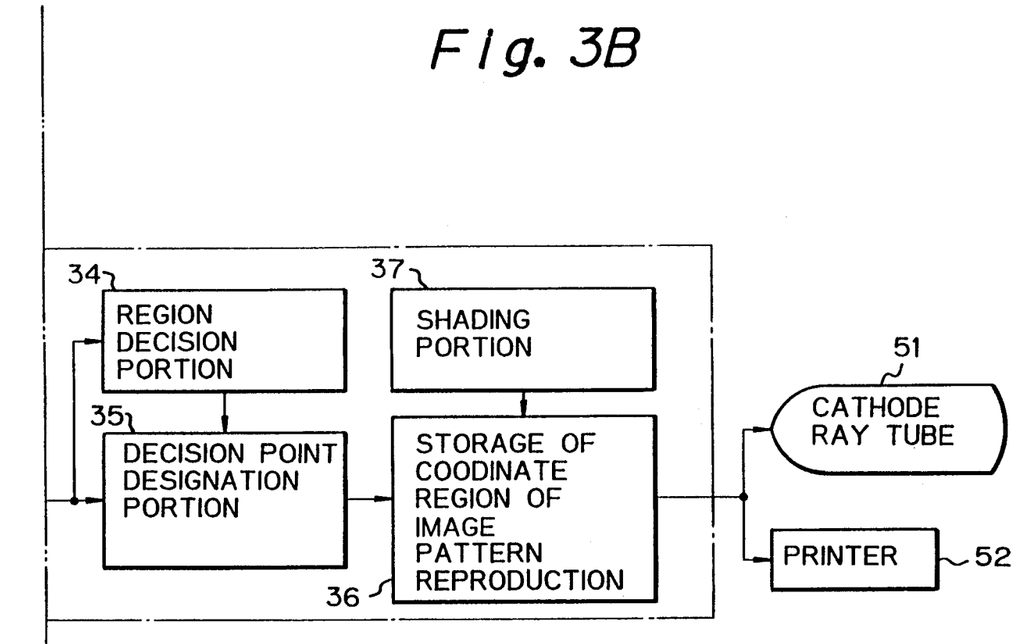

The schematic diagram of the system for reproducing an image pattern data according to an embodiment of the present invention is shown in FIG. 3. The system of FIG. 1 includes an outline data deviation unit 1 having an original image supplying portion 11, an image processing portion 12, an outline extraction portion 13, and a bend point extraction portion 14, an outline data storage 2, a pattern reproduction unit 3 having an outline data supplying portion 31, an outline reproduction portion 32, a decision point extraction portion 33, a region decision portion 34, a decision point designation portion 35, a storage 36 of coordinate region of image pattern reproduction, and a shading portion 37, an image storage 4, a cathode ray tube (CRT) display 51, and a printer 52.

Figure 4:
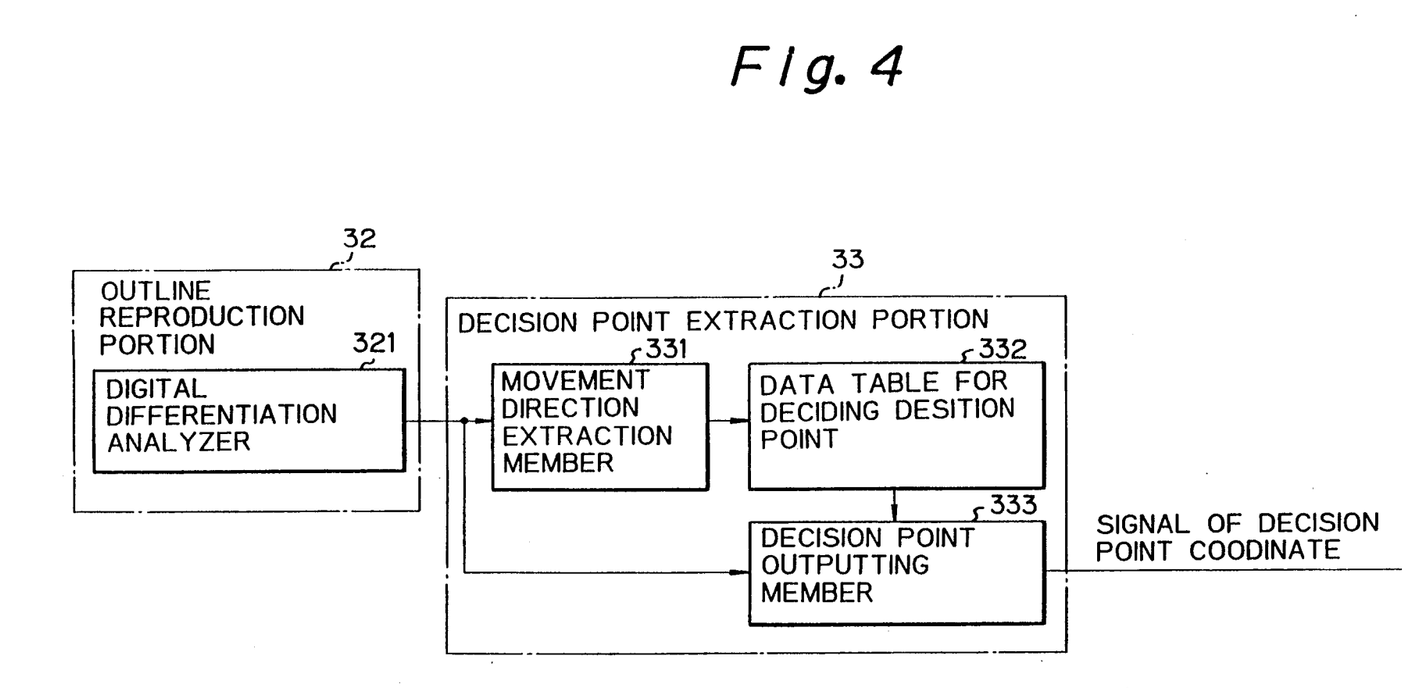
FIG. 4 shows an example of the structures of the outline reproduction portion and the decision point extraction portion in the system shown in FIG. 3.
Figure 5:
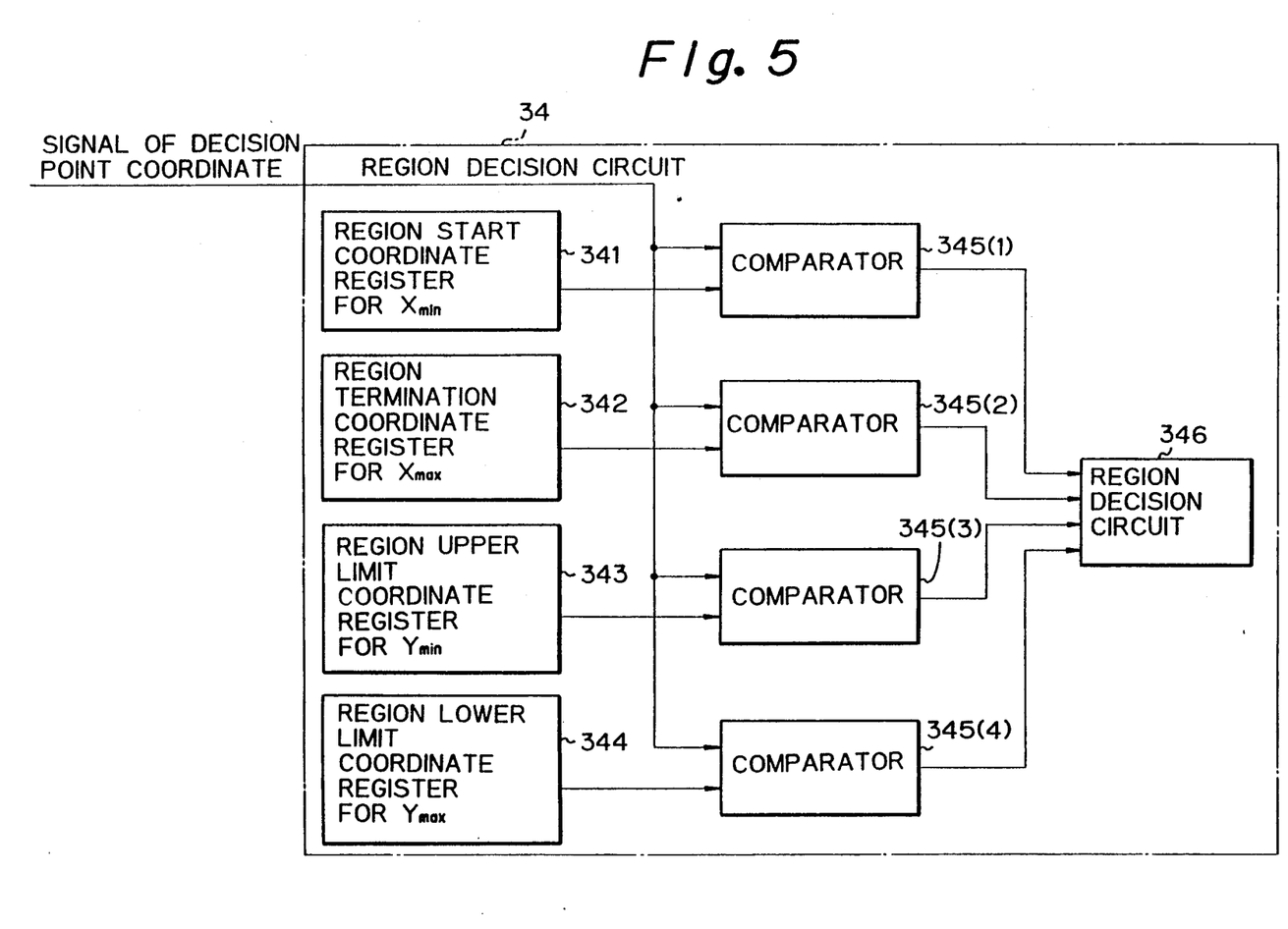
FIG. 5 shows an example of the structure of the region decision portion in the system shown in FIG. 3.

An example of the structures of the outline reproduction portion 32 and the decision point extraction portion 33 is shown in FIG. 4. An example of the structure of the region decision portion 34 is shown in FIG. 5. The outline reproduction portion 32 may be constituted by a digital differentiation analyzer 321, and the decision point extraction portion 33 may be constituted by a movement direction extraction member 331, a data table 332 for deciding the decision point, and a decision point outputting member 333. The region decision portion 34 may be constituted by a register 341 for region start coordinate (Xmin), a register 342 for region termination coordinate (Xmax), a register 343 for region upper limit coordinate (Ymin), a register 344 for region lower limit coordinate (Ymax), comparators 345(1), 345(2), 345(3), and 345(4), and a region decision circuit 346.

Figure 6:
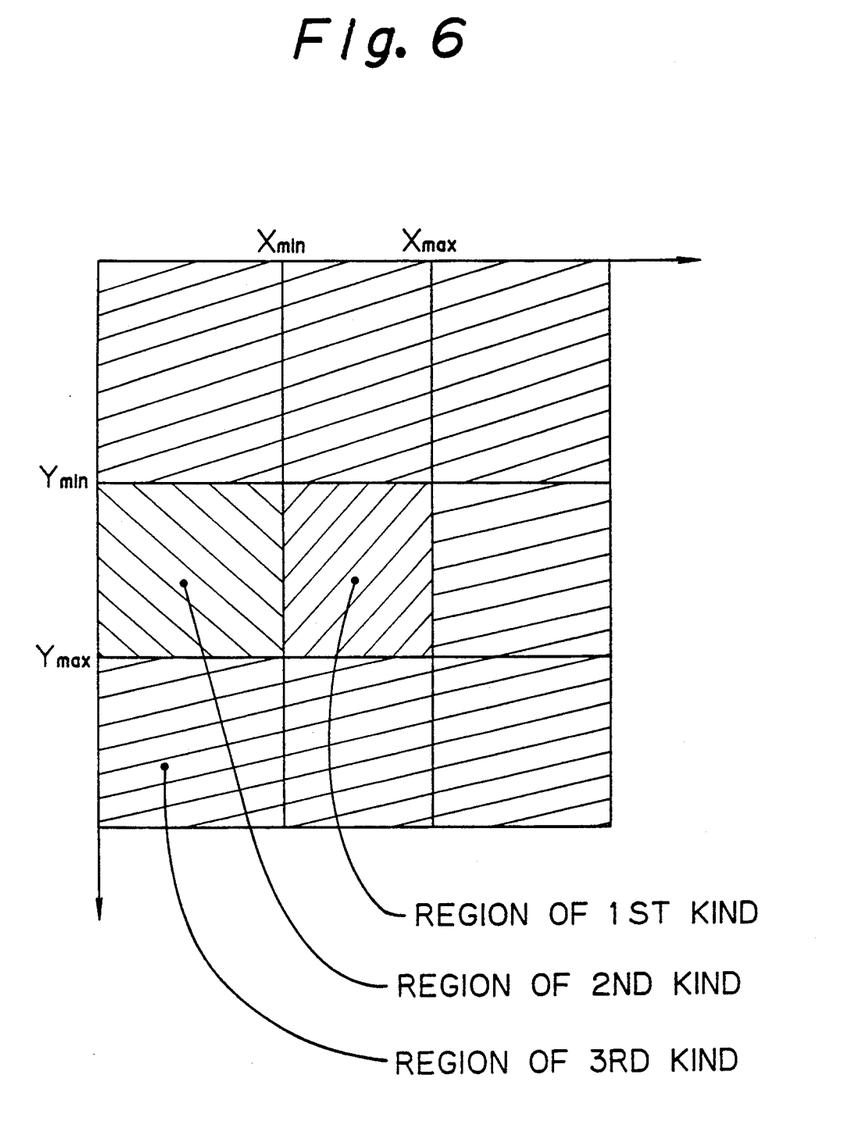
FIG. 6 illustrates the decision of the region by the region decision portion.

The decision of the region by the region decision portion 34 is explained with reference to FIG. 6. In the region decision portion 34, the decision concerning the decision point extracted by the decision point extraction portion 33 is carried out, based on the comparison between the extracted decision point and the coordinate values registered in the registers 341 to 344 in the region decision portion 34, to determine whether or not an extracted decision point is in the region of the 1st kind, in the region of the 2nd kind, or in the region of the 3rd kind.

The kinds of region (or subregions) are as follows. A coordinate region in which the image pattern is to be reproduced (an active region) is the region of the 1st kind, a coordinate region which is the preceding coordinate region of the coordinate region in which the image pattern is to be reproduced is the (natural) region of the 2nd kind, and a coordinate region other than the regions of the 1st kind and the 2nd kind is the region of the 3rd kind, as illustrated in FIG. 6.

Figure 7:
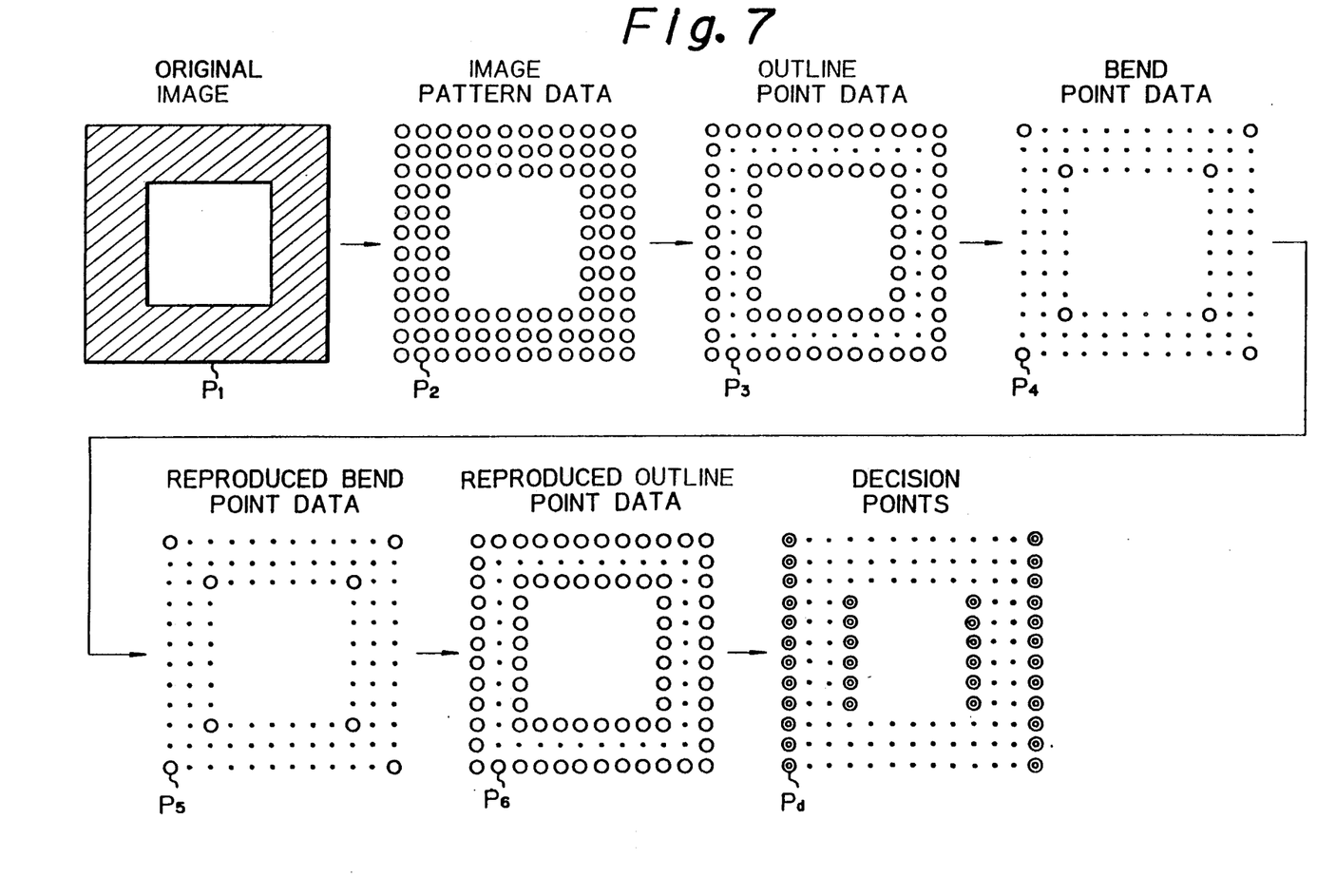
FIG. 7 illustrates of the operation of the system of FIG. 3.

The operation of the system of FIG. 3 is explained with reference to FIG. 7. An original image data $P_1$ is scanned and processed to produce an image pattern data $P_2$. The outline points data $P_3$ are extracted from the image pattern data $P_2$. The bending point data $P_4$ are extracted from the outline point data $P_3$. The outline data including the bending point data is stored in an outline data storage.

With regard to the process of reproducing the image pattern data, the bending point data $P_5$ is reproduced from the data stored in the outline data storage, the outline point data $P_6$ is reproduced based on the reproduced bending point data $P_5$, and the shading decision points or decision points $P_d$ are extracted from the reproduced outline point data $P_6$. The decision whether or not the extracted decision point is in the region of the 1st kind, in the region of the 2nd kind, or in the region of the 3rd kind is carried out.

The process of regeneration of an image pattern data in the system of FIG. 3 is explained with reference to FIG. 8. The entire area $A_O$ in which the entire outline points are to be reproduced is divided into divisional regions: division-A, division-B, division-C, and division-D. The designation of the decision points $P_d$ is carried out according to the following rule.

That is, when the decision point is located in the region of the 1st kind, the decision point is exclusively designated a the corresponding coordinate position in the coordinate region of image pattern reproduction in the divisional coordinate regions. When the decision point is located in the region of the 2nd kind, the decision point is exclusively designated at the scan starting point of the coordinate region of image pattern reproduction following this 2nd kind region. When the decision point is located in the region of the 3rd kind, no decision point is designated.

Figure 8A:
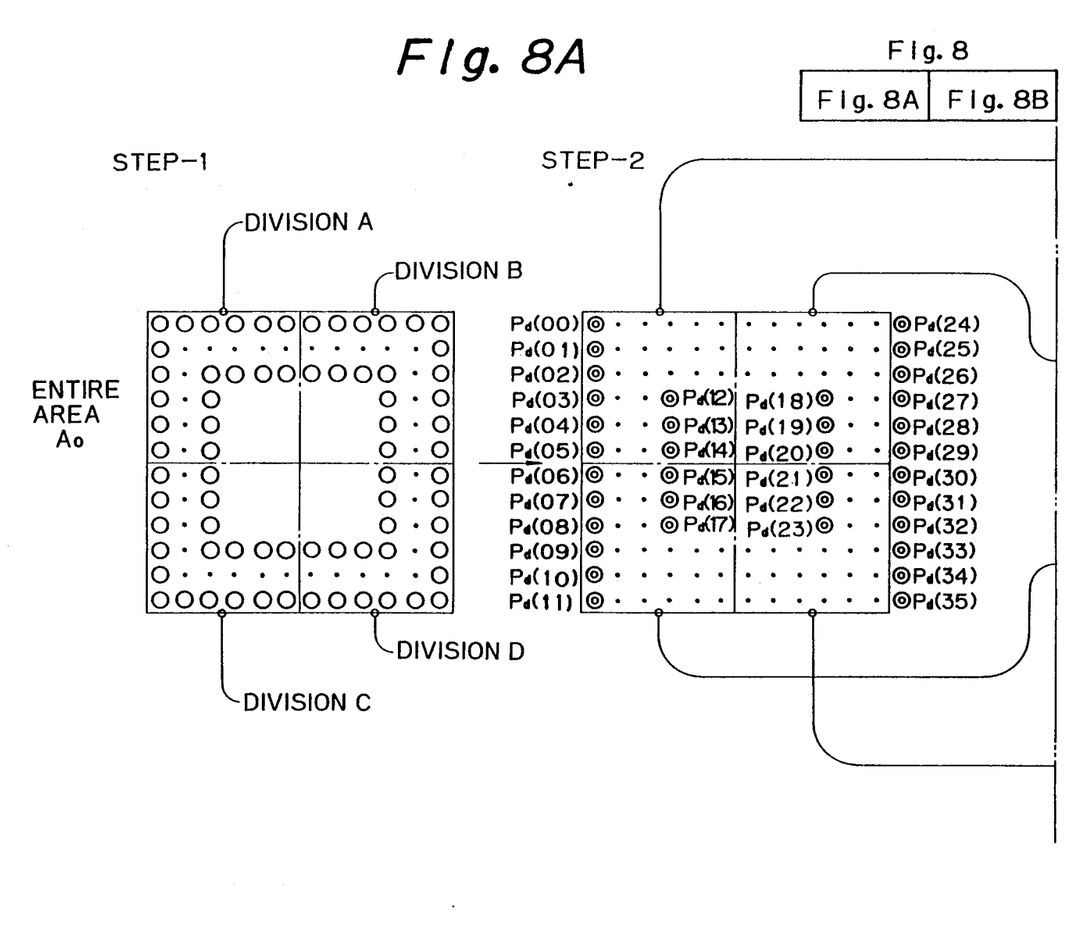
FIG. 8 illustrates the process of regeneration of an image pattern data in the system of in FIG. 3.
Figure 8B:
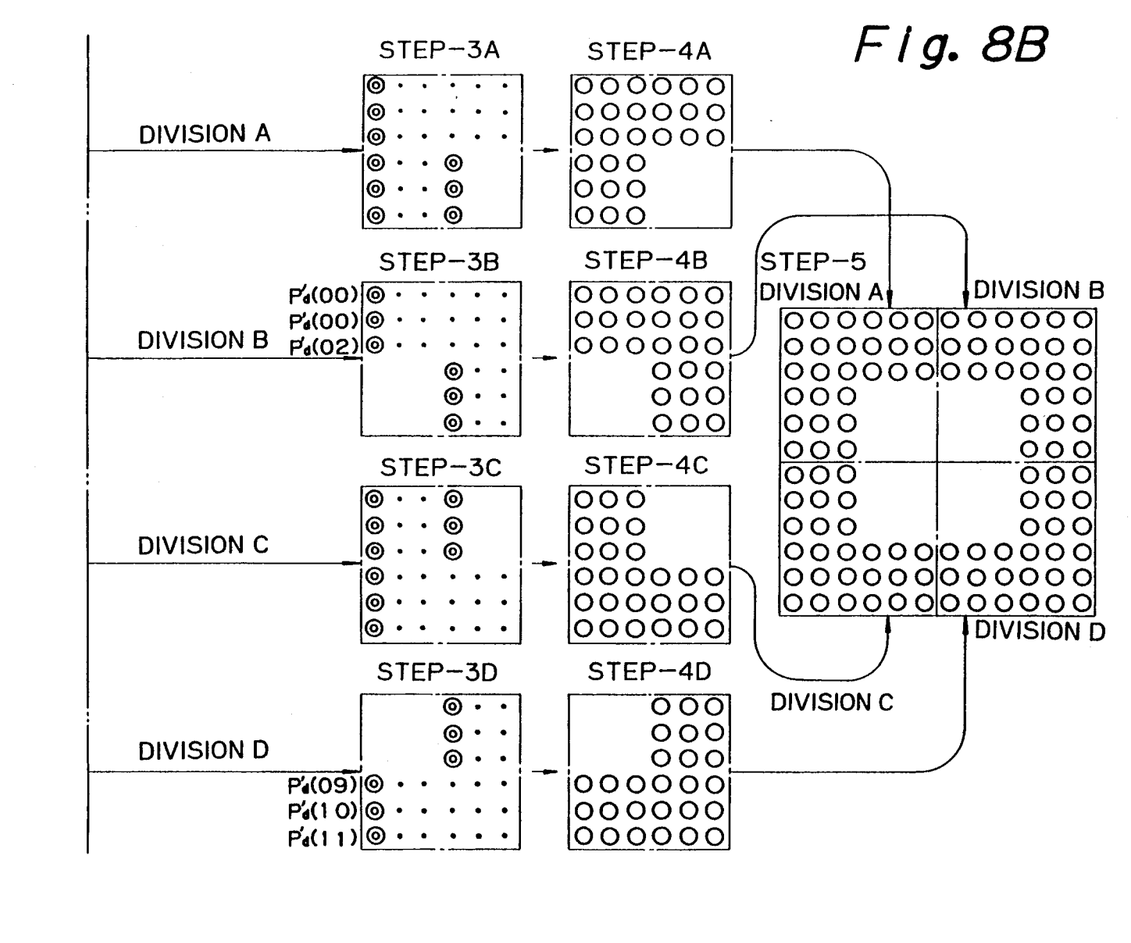

In FIG. 8, for division-A, division-B, division-C, and division-D, the nature of the division in question is illustrated in the first column, the designation of the decision points is illustrated in the second column, the shading of the dots is illustrated in the third column, and the synthesis of the divisions is illustrated in the fourth column.

With regard to division-A, since division-A is a region of the 1st kind, the decision points $P_d(00)$ to $P_d(05)$ and $P_d(12)$ to $P_d(14)$ are designated for the corresponding coordinate points in the coordinate region of image pattern reproduction. The shading of the dots is carried out accordingly.

With regard to division-B, since division-B is a region of the 1st kind, the decision points $P_d(18)$ to $P_d(20)$ are designated for the corresponding coordinate points in the coordinate region of image pattern reproduction, and the decision points $P_d'(00)$ to $P_d'(02)$ are designated at the scan start points of the 1st to 3rd scan lines based on the decision points $P_d(00)$ to $P_d(02)$ in division-A preceding to division-B.

In this regard, it may be considered that the decision points $P_d(03)$ to $P_d(05)$ are designated at the scan start points of the 4th to 6th scan lines based on the decision points $P_d(03)$ to $P_d(05)$ in division-A preceding to division-B. Nevertheless, such decision points $P_d(03)$ to $P_d(05)$ at the scan start points of the 4th to 6th scan lines must be cancelled in accordance with the rule of the exclusive designation. That is, the existence of the decision points $P_d(12)$ to $P_d(14)$ should cancel the decision points $P_d(03)$ to $P_d(05)$ at the scan start points of the 4th to 6th scan lines.

The shading of the dots is carried out accordingly.

With regard to division-C, since division-C is a region of the 1st kind, the decision points $P_d(06)$ to $P_d(11)$ and $P_d(15)$ to $P_d(17)$ are designated for the corresponding coordinate points in the coordinate region of image pattern reproduction. The shading of the dots is carried out accordingly.

With regard to division-D, since division-D is a region of the 1st kind the decision points $P_d(21)$ to $P_d(23)$ are designated for the corresponding coordinate points in the coordinate region of image pattern reproduction, and the decision points $P_d'(09)$ to $P_d'(11)$ are designated at the scan start points of the 4th to 6th scan lines based on the decision points $P_d(09)$ to $P_d(11)$ in division-C preceding to division-D. The cancellation of decision points $P_d(06)$ to $P_d(08)$ at the scan start points of the 1st to 3rd scan lines due to the decision points $P_d(15)$ to $P_d(17)$ in accordance with the rule of the exclusive designation is similar to the case of division-B. The shading of the dots is carried out accordingly.

The thus shaded division-A, division-B, division-C and division-D are synthesized to form a resultant reproduced image without any reproduction failures.

Although, in the embodiment described above, the ratio between the X or Y axis length of the area required for the reproduction of the original image and the X or Y axis length of the coordinate region of image pattern reproduction is selected to be 2 to 1, i.e., 12 dots versus 6 dots, it is, of course, possible to select the ratio to be more than 2 to 1.

We claim:

1. A system for reproducing an image pattern from outline data stored as a contour data, comprising:
   outline data input means for inputting outline data of an image;

outline reproduction means for reproducing outline points from the outline data input by said outline data input means;

decision point extraction means for retracting decision points from outline points reproduced by said outline reproduction means;

coordinate region forming means for forming a coordinate region for image pattern reproduction, obtaining the image pattern data and reproducing the image pattern data;

region decision means for dividing the coordinate region into a plurality of subregions each having a coordinate area equivalent to the image pattern reproduction coordinate area, where the image pattern to be reproduced requires a coordinate area greater than the coordinate area of the image pattern reproduction, and deciding whether a decision point extracted by said decision point extraction means is located in the active coordinate subregion in which the image pattern data is to reproduced, in the immediately preceding subregion of the active coordinate subregion, of in a neutral subregion other than the active or preceding subregions;

decision point designation means for exclusively designating a decision point at the corresponding coordinate position in th active subregion of image pattern reproduction when the decision point extracted is located in said active subregion, for exclusively designating the decision point at the scan starting point of the said preceding subregion, and for designating no decision point when the extracted decision point is located in said neutral subregion, and shading means, for shading the dots of the image based on the designation by said decision point designation means.

2. A system according to claim 1, wherein the shading means carries out the shading of the dots of the image, based on the designation by said decision point designation means, from the scan start point which is the decision point of an odd number (1, 3, 5...) order to the decision point of an even number (2, 4, 6...) order or one preceding point of the decision point of the even number (2, 4, 6...) order along the direction of the scanning.

3. A system according to claim 1, wherein said outline reproduction means is constituted by a digital differentiation analyzer.

4. A system according to claim 1, wherein said decision point extracting means comprises:

movement direction extraction means for extracting the direction of the movement of the outline from the outline data supplied from the outline reproduction means;

a data table of the decisions used for extracting the decision points based on the extracted direction of the movement of the outline; and decision point output means for supplying the extracted decision points.

5. A system according to claim 1, wherein said region decision means comprises a border coordinate register for registering border coordinates of a coordinate region designates as a coordinate region in which an image is to be reproduced, a comparison circuit for comparing the coordinate of the decision point extracted by the decision point extraction means with the border coordinates registered in the border coordinate register, and a region decision circuit for delivering, based on the result of the comparison by the comparison circuit, a data of the decision of the region indicating the decision concerning to which of the divisional coordinate regions the decision point belongs.

6. A system according to claim 1, wherein the outline data input means, outline reproduction means, decision point extraction means, coordinate region forming means, region decision means, decision point designation means, and shading means are formed as a one-chip semiconductor integrated circuit device.

7. A method for reproducing an image pattern data in which decision points for deciding shading points are extracted from outline data obtained by processing an original image data, the extracted decision points are designated in a coordinate region of image pattern reproduction, shading of the image is carried out according to the designated decision points, and accordingly a reproduction of the original image is realized in the coordinate region of image pattern reproduction, characterized in that said method comprises the steps of:

dividing the coordinate region in which the outline points of the outline data are to be reproduced into plurality of coordinate areas, each of which is equivalent to the area of the coordinate region of image pattern reproduction, where the original image pattern to be reproduced in the coordinate region of image pattern reproduction requires a coordinate region having an area greater than the coordinate region of image pattern reproduction;

deciding whether a decision point extracted from the outline data is located in an active coordinate area which is designated as the coordinate area in which the image pattern data is to be reproduced, in a preceding area which is the area immediately preceding the active coordinate area, or in a neutral area which is any coordinate area other than the active or preceding areas;

when a decision point is located in the active area the decision point is exclusively designated at the corresponding coordinate position in the coordinate area, when a decision point is located in the preceding area, the decision point is exclusively designated at the scan starting point of the active coordinate area, when a decision point is located in a neutral area, no decision point is designated, and carrying out, based on the exclusive designations, a shading of the dots of the image to reproduce the original image data, to thereby regenerate the original image pattern.

8. A method according to claim 7, wherein the shading of an image is carried out from a decision point of an odd number (1, 3, 5...) order as the shading start point to a decision point of an even number (2, 4, 6...) order or one preceding point of the decision point of the even number (2, 4, 6...) order and a scan termination point along a scan line, as the shading termination points, in the coordinate region of image pattern reproduction.

* * * * *